United States Patent [19]

Duncan, IV et al.

[11] Patent Number: 4,807,181
[45] Date of Patent: Feb. 21, 1989

[54] DICTIONARY MEMORY WITH VISUAL SCANNING FROM A SELECTABLE STARTING POINT

[75] Inventors: Howard C. Duncan, IV, Marathon; Donald T. Adams, Homer; R. William Gray, Ithaca, all of N.Y.

[73] Assignee: Smith Corona Corporation, Cortland, N.Y.

[21] Appl. No.: 869,777

[22] Filed: Jun. 2, 1986

[51] Int. Cl.⁴ .............................................. G06F 15/00
[52] U.S. Cl. ..................................... 364/900; 400/63; 400/98
[58] Field of Search .................... 364/200, 900, 419; 400/63, 98, 110

[56] References Cited

U.S. PATENT DOCUMENTS

| | | | |
|---|---|---|---|
| 4,158,236 | 6/1979 | Levy | 364/900 |
| 4,339,806 | 7/1982 | Yoshida | 364/900 |
| 4,342,085 | 7/1982 | Glickman et al. | 364/200 |
| 4,374,625 | 2/1983 | Hanft et al. | 364/900 |
| 4,383,307 | 5/1983 | Gibson, III | 364/900 |
| 4,396,992 | 8/1983 | Hayashi et al. | 364/900 |
| 4,438,505 | 3/1984 | Yanagiuchi et al. | 364/419 |
| 4,456,973 | 6/1984 | Carleren et al. | 364/900 |
| 4,459,049 | 7/1984 | Howell et al. | 364/900 |
| 4,500,955 | 2/1985 | Chang | 364/200 |
| 4,650,349 | 3/1987 | Westreich | 364/900 |
| 4,655,620 | 4/1987 | Adams et al. | 364/900 |

OTHER PUBLICATIONS

IBM Technical Disclosure Bulletin, "Word Generation System for Typist", Arellano et al., vol. 17, No. 8, Jan. 1975, pp. 2422-2423.

Primary Examiner—Thomas M. Heckler
Assistant Examiner—Adolfo Ruiz

[57] ABSTRACT

A portable electronic typewriter having a memory incorporating a low-cost spelling-check dictionary and including a multi-character display. The typewriter is operable in a "List" mode according to which the operator can call up display of a portion of the dictionary, sequentially in alphabetical order and one word at a time. The display consists of each stored word sharing an initial set, or "string", of n characters (termed a "template") defined by the operator via the keyboard of the typewriter. In a preferred version, when the typist becomes aware of uncertainty as to spelling, the List Mode may be initiated either before or after partial entry of the desired word. In particular, if the characters entered include an erroneous one, (the typist being alerted of this by an audible alarm, for example), initiation of the List Mode thereafter causes the string to be truncated just before the erroneous character. The resultant template is appropriate for entry into the word listing of the Dictionary and display of successive words (under control of the typist), all of them beginning with the previously defined characters. When the desired word appears on the display the typist can cause that word to be added replacingly to Memory and to the printed text.

10 Claims, 3 Drawing Sheets

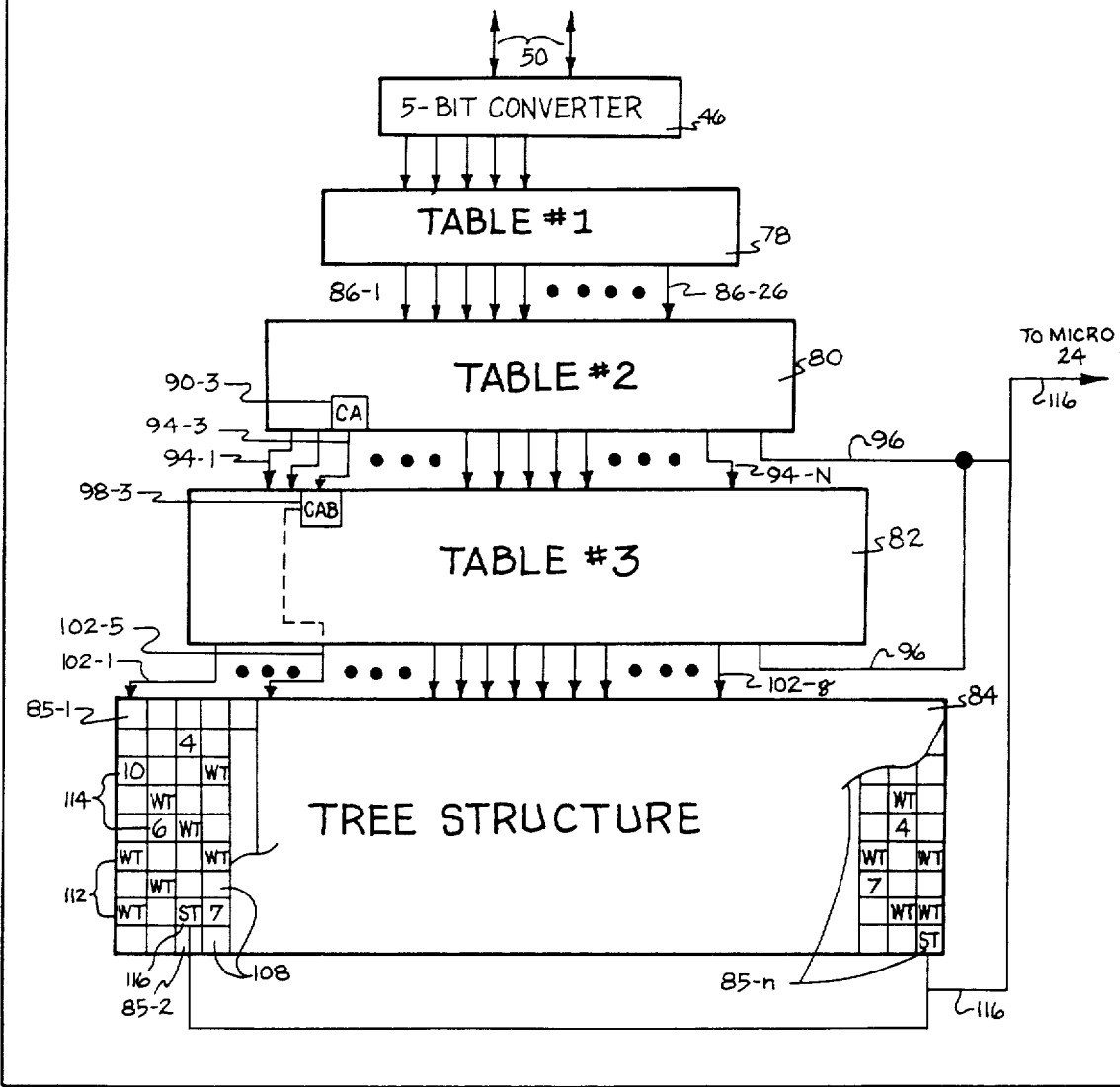
FIG. 2
FIG. 4
FIG. 5

DICTIONARY MEMORY WITH VISUAL SCANNING FROM A SELECTABLE STARTING POINT

RELATED APPLICATIONS

The present invention is an improvement on the "dictionary" typewriter disclosed in U.S. Pat. Nos. 4,782,464 and 4,783,761 entitled "COMPACT SPELLING-CHECK DICTIONARY" and "SPELLING CHECK DICTIONARY WITH EARLY ERROR SIGNAL", respectively; both filed Dec. 26, 1985 by the same inventors and assigned to the same assignee.

FIELD OF THE INVENTION

The invention relates to word processors (or "memory" typewriters as they are sometimes called), which normally incorporate the capability of correcting any erroneous words in a last-entered group of words, such as a line, paragraph, etc. More particularly, it relates to those of the "dictionary" type—i.e., those storing lists of commonly-encountered words to which the system controls can refer for determining accuracy of spelling.

BACKGROUND

Correcting typewriters have long been known which could remove incorrect characters and allow entry of correct ones by following an appropriate, but lengthy, sequence of keystrokes. With the advent of recording typewriters (paper tape, magnetic tape, magnetic card, etc.) it became possible to reduce the number of keystrokes required, but insertion of additional characters was still a cumbersome, time-consuming procedure. "Dictionary" typewriters such as those disclosed in the related applications (referred to hereinafter as "Reference I" inasmuch as they are practically identical as to specification and figures) have recently appeared on the market. These have an electronic memory for storing one or more pages of entered text in a random access section of the memory (RAM), together with a lengthy list of commonly-used words—35,000 say, all words in this list being correctly spelled and stored in compressed form in a read-only section of the memory ROM and a comparison unit monitoring successive text entries and emitting a visual or auditory signal when comparison of entered characters (a fragment of a word) with the list of words in the memory (the "dictionary") indicates a disagreement in the spelling of the entered word fragment. That signal indicate the typist's entry to be erroneous, such that spelling of the just-entered word or fragment of same should be checked. In more powerful versions, the typewriter have an associated display unit, where prior text (including the incorrect word or fragment) may be visually presented before being printed.

While the foregoing improvement have done much to enhance the quality of communications prepared by poor spellers, the efficiency of typewriter use is still not optimum because time spent finding a printed dictionary and looking up the correct spelling of the word or fragment would be more productively spent as further typing. Thus, there is need for reducing time spent in correction of errors and for fully utilizating correct information stored in compressed form in the memory; before or after printing occurs, of course.

SUMMARY OF THE INVENTION

In a word-processing apparatus having an input keyboard with alphabetic keys, a multi-character display, a printer output, and a dictionary storage containing a word list for verifying the spelling order of character inputs; the combination of: first and second special key means included in the input keyboard, template forming means operable in response to entry of a string of alphabetic characters via the alphabetic keys, means responsive to the first special key means and being operable to clear the display of existing characters and to replace same with a first word from the dictionary storage containing the template formed by entry of the string; and means connected to the second special key means and being operable to replace, in turn, the first word discerned by the template with a succeeding word in the dictionary storage in response to each operation of the second special key means so long as the template is shared by the succeeding word.

It is thus an object of the invention to provide a dictionary structure which allows word-by-word presenation of the word list stored therein starting at any arbitrary point designated by the operator.

A further object of the invention is to provide a dictionary where the arbitrary point lies before an erroneous character entry.

Other objects and features of the invention will become evident from a reading of the ensuing description taken in conjunction with the drawing.

BRIEF DESCRIPTION OF THE DRAWING

FIG. 2 is a schematic diagram showing the organization of a dictionary useful with the typewriter of FIG. 1, comprising three look-up tables for the first three characters in a word, together with a tree structure extending the third table into as many characters as needed on a shared basis for complete coverage of the word list in the dictionary of FIG. 1.

FIG. 4 is a schematic diagram showing the typical order in which characters of the words listed in the dictionary of FIG. 1 are stored and also as they are displayed in the List Mode according to the invention (bold characters indicating those only stored once, but being shared by two or more words, and all characters being displayed in each instance).

FIG. 5 is a schematic diagram showing a register for holding character identifying data in a form simplifying display of words subsequent to the first word presented.

Figure 1:
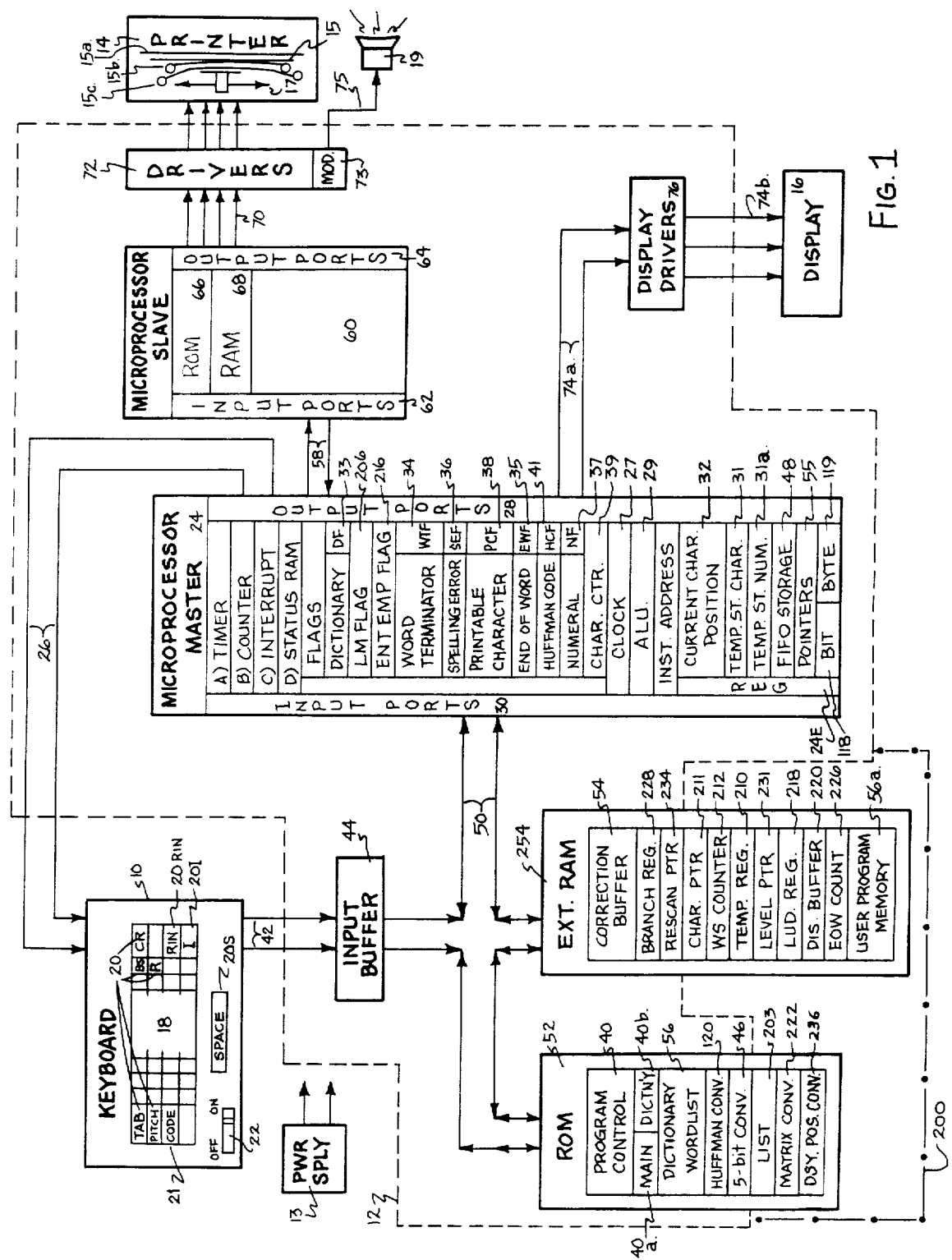
FIG. 1 is a block diagram of a selectively scannable word listing dictionary typewriter (or word-processing apparatus) according to the invention.
Figure 3:
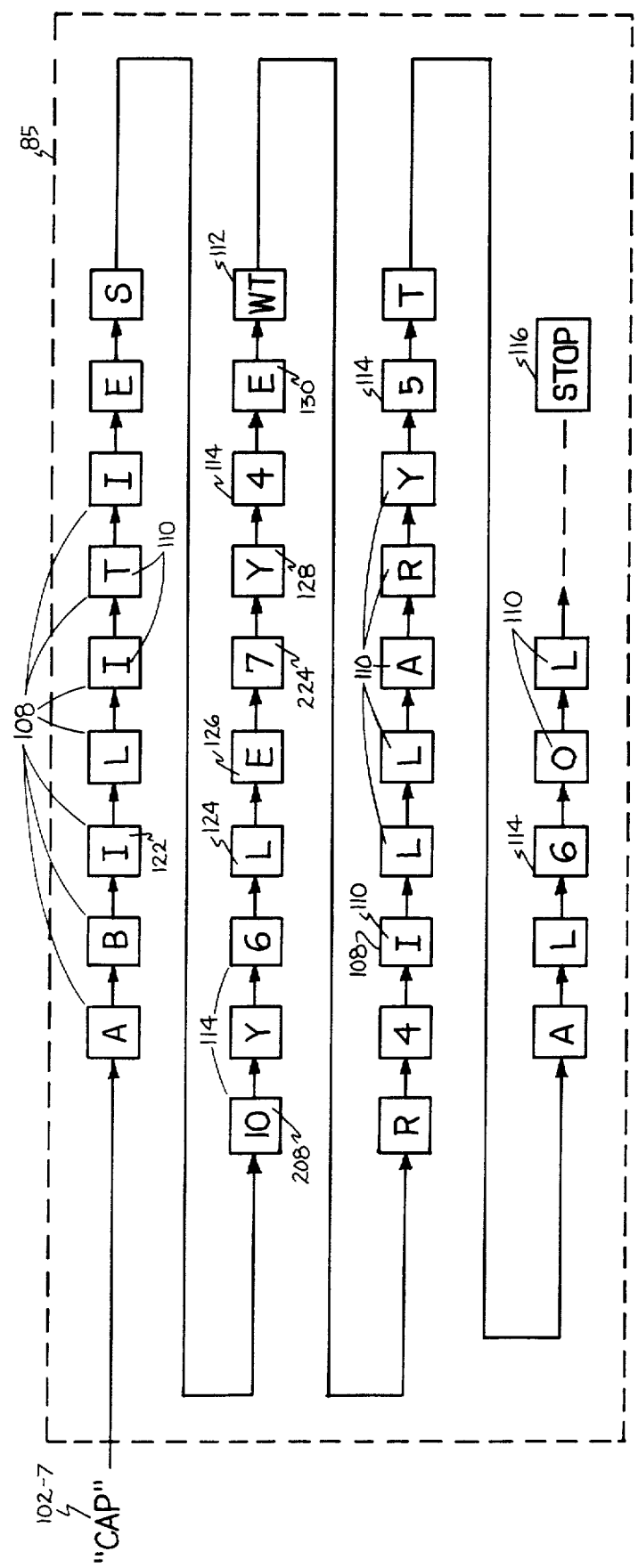
FIG. 3 is a schematic diagram showing a typical branch in the tree-structure look-up table extension of FIG. 2, each branch containing a number of words with a common root, i.e.—sharing at least a particular three (more or less, where preferable) characters from the look-up tables, though some words may share additional characters in the branch.

Note that FIGS. 1, 3 and 4 are essentially identical to FIG. 1, 5 and 6 of References I (except for reorganization of the memory in known fashion for purposes of adding more RAM capacity), while FIG. 2 herein is a composite of FIG. 2 and 3 of these same references. It may also be noted that reference numerals are the same for like elements in all three figures comparable to those in References I (the previously-identified related applications), but where they have been modified for purposes of the present invention, the reference numerals are three digits long and begin with the number 200. Other changes for economy or improved efficiency made in a known fashion and in areas not relevant to the present invention may be mentioned in the description which follows, but only briefly and in order to reduce possible confusion when comparing the figures.

DESCRIPTION OF THE PREFERRED EMBODIMENTS

The invention will now be described as embodied in an interactive word information processing system 8 (also known as a dictionary typewriter when implemented as a unitary device) shown in block form in FIG. 1. The word information processing system 8 of FIG. 1 has four principal elements comprising a keyboard 10, an electronic control circuit 12 (encircled by dashed lines), a printer unit 14 and a display unit 16. Circuit 12 stores a multi-word dictionary 56 in its memory unit (a ROM 52 and a RAM 254 together with known additional internal storage in a Microprocessor 24, as will be seen), such as that disclosed in our previously-identified co-pending applications (which are practically identical as to the specification and will therefore be termed "References I" for simplicity).

For purposes of the present invention, Control Circuit 12 has been modified to include a sub-section 200 shown as an adjunct bounded by the dot-dash lines at the bottom of FIG. 1. Sub-section 200 in cooperation with Dictionary 56 and Display 16 provides the controls for a "List-Mode" function in accordance with the invention.

In general the List Mode function allows the typist to scan through a selectably limited portion of Dictionary 56 when a particular word is sought, but the typist is uncertain of the spelling. The scan and its limits are controlled by the typist, one word being sequentially presented at a time on a Display 16 in an activity exactly analogous to thumbing through selected pages of printed dictionary. Once a desired word is displayed, the typist can add it—in a manner described below—to text previously displayed or printed on a Document 15a by pressing Return Key 20R. Printing of the desired word includes any required erasing of previous text and even realignment of removed text when the length of the desired word exceeds that of the word it is to replace.

To activate List Mode, the typist simultaneously pressed Code Key 21 and "L" Key 18L on Keyboard 10. In a first embodiment, Display 16 then shows the instructions: "List:" as a prompt for the typist to enter 1 to 15 characters of a template defining an initial sequence of characters in the desired word. Electronic search of Dictionary 56 then begins with the character sequence of that template as the starting point. Thus, if the single character "C" is entered by pressing the Key 18C on Keyboard 10, the search begins at the start of the C listing and every word in Dictionary 56 beginning with a "C" could be displayed sequentially upon successive pressings of an Index Key 20I (present on many a typewriter Keyboard 10 and being alternatively termed a "linefeed" key). On the other hand, if the entered Template were the letters C-O-N, then only those words starting with that sequence of characters would be displayed.

In this List Mode, Display 16 shows a single word at a time as stated above. Pressing the usual Index Key 20I on Keyboard 10 (normally resulting in feeding printed page 15 to the next line down) displays the next word from Dictionary 56 which shares the template as its initial sequence of characters. If the typist wishes to review the alternatives after two or more words have been displayed, the usual Reverse Index Key 20RIN on Keyboard 10 (normally providing a reverse movement of printed page 15 to the previous line) may be pressed, the previous word then being moved back into Display 16 as replacement for the current word. Thus, the entire portion of Dictionary 56 comprising all words containing the entered template can be searched in a forward direction and the words meeting the criterion being displayed one-by-one and then reviewed one-by-one, if desired, by recalling them in the reverse direction, beginning with the word displayed just prior to the current one.

To make operation even easier for the typist, a second embodiment of the invention (referred to hereinafter as Embodiment II) provides that List Mode can be initiated after a partial entry has been typed. In such case, the characters already typed become the template automatically, and individual words containing that template as an initial sequence of characters again are displayable successvely with each pressing of the Index Key 20I (or recalled in the backward direction by pressing Reverse Index Key 20RIN). Similarly, if a word is being typed and a warbling sound from beeper 19 signals a spelling error, the typist may stop typing immediately and again press Keys 21 and 18L simultaneously. In that case, the typed word fragment is truncated by Sub-section 200 of Control Circuit 12 (see FIG. 1), as detailed subsequently, only the portion up to occurrence of the error being used as the template.

Once the desired word is located by searching Dictionary 56 as described above, the typist's pressing of Return Key 20R causes that word to be placed in Correction Buffer 54 (and also printed, if in a known "Type" Mode or in order circumstances described later).

For example, if the typist had entered "anniverc" (for anniversary) the System 8 would emit an alarm upon pressing the "c" key 18c, but it would be typed. Activating List Mode immediately by simultaneous pressing of keys 21 and 18L thereafter would yield "anniver" as the template. Pressing Index Key 20I once would then present "anniversary" in Display 16. Then, when the typist pressed Return Key 20R, indicating acceptance of this word as having been the one in mind when the erroneous entry was made, the incorrect character "c" would be erased automatically (in known fashion using the correction ribbon 15b) and "sary" printed thereafter (again in known fashion, but using, say, an inked ribbon 15c) with the "s" occupying the blank space left by erasing the incorrect character.

Before beginning a detailed description of the "List Mode" structure, a short overview of the entire system will be given (more complete details of the Dictionary portion may be found in References I). Keyboard 10 includes a normal set of symbol keys 18 and typewriter function keys 20, the former relating to printable characters, numbers and punctuation marks, etc.; and the latter relating to format control or other special function commands in the system. A two-position switch 22 selectively enables and disables operation of keyboard 10. Some function keys 20 labeled in FIG. 1 include: carriage return (R), backspace (BS), index (I), Reverse Index (RIN), tab (TAB), pitch (PITCH), correct (CR), and space (SPACE). A "code" function key 21 (always operated in conjunction with one of the keys 18 or 20) serves to select an operative mode of the system, such as the "dictionary" mode previously disclosed and—according to the invention described below—the "List Mode" to permit initiating a scan of Dictionary 56 based on pre-selection of a limited number of characters (determined essentially by the point at which the typist becomes uncertain as to spelling) controlled by the Sub-section 200. Assuming switch 22 is in the ON position, depression of any one of the various keys 18, 20 etc. on keyboard 10 operates a switch matrix (not shown, but known) scanned periodically by electronic circuit 12 in a known manner to generate a keyboard output signal uniquely related to the depressed one(s) of the keys e.g. 18, 20 or 21. The four principal units 10, 12, 14 and 16 of FIG. 1 interact in the usual fashion, manual selection of any desired typewriter operation being made at keyboard 10. Printer unit 14 is operated—in turn—under control of electronic circuit 12 for accomplishing the function selected by a keyboard input—such as, for example, printing a character corresponding to a selected character key 18 or corresponding to characters supplied by the display sequence controlled by Sub-section 200 as described subsequently. Though preferably embodied in an electronic typewriter, the units 10, 12, 14, 16 and 200 alternatively may comprise individual components combined in a manner common to many word processing systems.

Just as in References I, overall system operation is controlled here through microprocessor 24 (a known electronic component located within the electronic control circuit 12) connected to keyboard 10 by bus lines 26. Master microprocessor 24 typically has output ports 28, input port 30 and various electronic control elements including a number of storage registers. One example (others being identified subsequently) is a Current Character Position register 32 which keeps track of the current character position in relation to a previous reference position along a type line 15 of printer 14 (a daisy type impact printer for purposes of this description although other types would be equally suitable) as the character information is printed on a sheet of paper 15a. Some operative elements in the master microprocessor 24 include (A) TIMER, (B) COUNTER, (C) INTERRUPT, AND (D) STATUS RAM (a "Random Access Memory"). TIMER 24A is a conventional unit providing predetermined time delays required in the system. COUNTER 24B functions to continually update the system's operation during interruption in the system. INTERRUPT 24C initiates a periodic scan of keyboard 10 to determine whether a new key selection has been made. STATUS RAM 24D provides temporary storage of current keyboard information for reference and recall purposes as will be seen. In addition, STATUS RAM 24D provides for a plurality of FLAGS (single-bit, two-state memory units, the current state of which is periodically interrogated as part of the machine's program routine, the program path varying in accordance with the state determined). These include a "Dictionary" flag 33, a "Huffman Code" flag 41 and a "List Mode" flag 206. Only flags relevant to the invention are discussed herein though other known flags may also be present. RAM 24D also includes a byte 38 which functions as a Character Counter (software), being incremented by unity as each character of a word is entered from Keyboard 10.

Master microprocessor 24 communicates with Keyboard 10 through INTERRUPT 24C for scanning Keyboard 10 at intervals of several milliseconds (under control of TIMER 24A) to detect any key depressions. Detection of such causes a unique set of signals representative of the selected key (18,20 or 21) to be issued on lines 42 to a Buffer Chip 44.

Buffer Chip 44 (a known "I/O Expander" multi-purpose LSI chip), transfers the signal set to a FIFO storage section 48 where they are temporarily held until completion of processing a previous keyboard input. Each set is then fetched in the order of input, under program control (see below) for decoding in known fashion to provide a daisy position code signal on a bus line 50 when the signal set held in FIFO section 48 originates from depressing a printable symbol key 18. Non-printable special function signals arising from depressing keys 20 (or keys 18,20 in combination with the code key 21) are also decoded in known fashion, but into Printer Format or other control data for subsequent processing.

As seen in FIG. 1, the printer code signals from FIFO section 48 appear on a bi-directional bus line 50 connected to a ROM 52 (Read-Only Memory), a RAM 254 (a unit separate from Buffer 44 as herein disclosed because of a need for capacity greater than that available in the RAM unit 54 of References I) and to input ports 30 of master microprocessor 24. In the instance of printable symbol key depression, the printer code signals are sent to RAM 254 for storage. ROM 52 includes a Program Control section 40 and Dictionary storage section 56, as disclosed in References I. Program Control section 40 of ROM 52 contains not only the main program 40a, with necessary instructions to operate master microprocessor 24 in a prescribed manner (e.g. one similar to those known for control of "daisy-wheel" typewriters), together with a secondary set 40b of program instructions for a Spelling Check type of operation (See References I), but also—according to the present invention—a tertiary set 203 of program instructions for the List Mode operation, as will be described. Dictionary storage section 56 of ROM 52 contains a multiplicity of addressable codes assembled to form words of a word list used to verify the spelling order of characters upon release of printer decode signals from RAM area 54 of RAM 254 as described briefly below. RAM area 54 is identical to that of References I and primarily functions as a correcton buffer for keeping track of the last plurality of printable character inputs for orderly recall but is also used for purposes of the present invention, as will be described. Character inputs are stored in a particular RAM area 54 (part 254) as stated earlier, in the form in which they are processed for printing and/or display under control of master microprocessor 24, this storage area 54 retaining all characters entered into a line such that they are available for purposes of correcting the text on paper 15a until pressing of Return key 20R starts a new line of printed entries. Area 54 will therefore be referred to hereinafter as "Correction Buffer" 54.

Code from internal or external memories (e.g. STATUS RAM 24D of master microprocessor 24, RAM 254) are communicated along the serial output channels 58 of master microprocessor 24 to a slave microprocessor 60 which has input words 62 and output ports 64, a program stored internally in a ROM (Read-Only Memory) 66, and the current code data stored internally in a RAM 68, these code data being interpreted by the program in ROM 66 in usual fashion to supply control and drive signals to Printer Drivers 72 over lines 70. In turn, printer drivers 72 operate the printing components of printer 14 (e.g. a daisy-type printwheel 17 supporting the printable characters). Similarly, display drivers 76 connected to master microprocessor 24 by lines 74a serve to operate (via lines 74b) display 16 (e.g. a known liquid crystal dot matrix) for visually presenting the last plurality (16, say) of character inputs in known fashion. Display 16 may be operated in conjunction with or independently of printer 14.

A brief general description relating to the basic operation of character input monitored by a spelling check as in the word information processing systen of FIG. 1, will next be given. Operator depression of a keyboard key (18,20,21) is detected in the previously-mentioned matrix scan initiated by INTERRUPT 24C. A unique signal set representative of the selected key is then sent to FIFO section 48 and stored until decoded by Microprocessor 24 as is known. If determined that the selected key is one of the printable character symbol keys 18, flag 38 is set, or if it is the "D" or "L" symbol key 18D or 18L accompanied by simultaneous depression with CODE key 21 a different flag is set such as Dictionary Flag 33 or the List Mode Flag 206 of the present invention. Each key input is released on a first in-first out basis in response to processing of all preceding key inputs, as stated earlier, and again appears on bus line 50. There it is applied essentially simultaneously to ROM 52 and RAM 254 by master microprocesser 24. In ROM 52, Program Control 40 is interrogated or read for appropriately operating master microprocessor 24 according to desired program routines in known fashion. The decoded signal from line 50 is also applied to Dictionary section 56 for a spelling check in the manner described in detail in References I and briefly reviewed herein. It should be remembered, though, that the decoded signals sequentially stored in Correction Buffer 54 are in the form of Daisy Position or Printer Format Codes too unwieldy for spelling check purposes, hence the necessary further code conversion is readily performed in known fashion by using the printer codes as arguments in a look-up table 46, likewise stored in ROM 52. The preferred code output from table 46 is a simple 5-bit binary expression of the alphabetic order from 1 to 26 A to Z. In most cases, upon entry of successive characters of a word by use of keyboard 10, Master microprocessor 24 under direction of main Program Control 40a operates slave microprocessor 60 for ultimaterly processing each selected key function at printer 14 without incident into a corresponding succession of imprints on sheet paper 15a. Should the typist strike a wrong key, however, the system will detect this and emit a warbling signal through beeper 19 of FIG. 1 to alert the typist.

The dictionary storage apparatus of References I is used with the List Mode sub-section 200 according to the teachings of the present invention and described in detail below in view of FIGS. 2-5. In FIG. 2, the four major storage areas comprises in Dictionary storage section 56 are shown. Storage section 56 contains a multiplicity of character address codes relating to particular characters and arranged to provide all alphabetical listing of words. The words are stored using three look-up tables 78, 80, 82 (where each character is generally present in the five-bit binary code previously mentioned) and a character tree structure 84 (where each character is generally present in a compressed of "Huffman" code). The three look-up tables 78, 80, 82 are connected in series to verify the spelling order of the first three character inputs. The tree structure 84 extends from the third table 82 and provides the information for verifying the spelling order of characters beyond the third character of the longer words. For simplicity, three structure 84 is referred to as "Extension 84" hreinafter.

Verification of spelling order of each entered character involves known comparisons with characters of valid words such as those stored in the above-mentioned tables of Dictionary 56 in the manner described in References I, for example. These comparisons utilize the known comparison function provided by an arithmetic logic unit in Microprocessor 24 (shown as a block labeled "ALU 29" in FIG. 1).

While just three look-up tables were required for the three "root" characters which preceded each and every Huffman Code Branch 85 of Extension 84 of References I, for reasons of avoiding inordinately long or very short Branches 85 (with correspondingly long spelling-check times or inefficient use of memory space, respectively) it has been found preferable for some word groups to allow more root characters (up to five, as seen later) or even one less root character than the three disclosed in Reference I. This flexibility should be kept in mind as preferable, although description herein will nonetheless be based—for simplicity and ease of understanding—on the structure as disclosed in Reference I, inasmuch as the same principles apply regardless of whether two, three or five characters precede particular ones of the Huffman Code Branches 85.

Each one of the three Dictionary tables 78, 80, 82 has a multitude of addressable memory locations and each memory location contains a unique output address or "pointer" that relates to a particular character in conjunction with the previous characters of the word. The first Dictionary table 78 has addresses relating to first character input (first one after a space—or equivalent punctuation mark separating successive words) and establishes the identity of the character beginning the spelling of a word. The second table 80 has addressed arranged in groups to confirm the spelling order of the second character input in conjunction with the first entered character. Similarly, the third Dictionary table 82 has addresses arranged in further groups to verify the spelling order of the first three character inputs. As will be recalled, the order of entry of the characters of a given word upon sequential depression of the desired keys 18 is tracked in the one-byte software counter 39 in Status RAM 24D, the value in the byte being incremented by unit as each entry occurs. Tree structure 84 on the other hand, has branches 85 individually comprising a string of character memory locations 108 corresponding to additional characters in one or more words having the same three-character root. Each branch 85 is therefore chosen by one address location in the third table 82 (generally true, but with some exceptions described subsequently) for checking the spelling order of the fourth and all subsequent character inputs.

As explained in greater detail in References I, the above-mentioned entry of an incorrect character in the succession of characters forming a desired word but failing to match any characters at that location in the prior part of the words in the listing stored in section 56, therefore leads to production of a signal on the "End-of-Table" output 96 in the Tables 80,82 or on the "Stop" output 116 signifying the end of a given one of the branches 85-n in extension Table 84. These signals then result in the setting of "Spelling Error" flag 36 and early emission of the warbling output from device 19 of FIG.

1 to alert the typist. In order to decide the correct spelling in this case and also when in doubt before entry of any characters or after entry of some initial characters of a desired word, the typist may then call up a display of successive words listed in alphabetical order which share the same initial characters entered up to the last character (or no further than the incorrect character), as will now be described in detail in accordance with the List Mode of the present invention.

As stated above, tree structure 84 (FIG. 2) includes a multiplicity of memory locations 108 arranged in discrete Branches 85-n for verifying (or merely showing, in the present case) the spelling order of valid words beyond the third character. Each Branch 85 is chosen by a related one of the pointers 102-q extending from the third table 82 and likewise stored in Pointer RAM area 55. A typical Branch 85 consisting of a number of memory locations 108 strung together is illustrated in FIG. 3. As seen there, memory locations 108 forming each Branch 85 contain pre-programmed information including one or more characters 110 of particular words, related Word Terminators (WT) 112, one or more numerals 114 denoting nodal points at which prior characters are shared by two or more words and, lastly, a "stop" or "End-of-Table" (i.e., the end of Branch 85) command 116.

The characters 110 at locations 108 are arranged in the Branches 85 to spell the remaining characters of successive valid words that share generally the first three characters established by the tables 78, 80 and 82 except as noted earlier.

In the Branches 85, successive words are separated by the word terminator codes WT 112 and also by the numeral codes 114, each WT code 112 or numeral code 114 being arranged to follow immediately after the last of a string of characters that correctly spell a valid word in Dictionary section 56. Note in this respect that many of the WT codes 112 (specifically thsoe preceding a numeral code 114) in FIG. 5 of References I proved to be redundant, numeral codes being capable of serving as word separators also, as evident upon comparing FIG. 3 herein with FIG. 5 of References I.

The numeral byte at each location 114 in FIGS. 2 and 3 signifies, therefore, both an end point in a word of the listing and also a "node"—an ordinal position in a word where preceding characters are shared in forming at least two different words. As evident from FIG. 3, each Branch 35 stores all characters in a linear succession from start (e.g. 102-7 in Fig.3) to end (e.g. 116), the various nodes being demarked by the numeral bytes at locations 114, and alternate sub- branches at these nodes being discernible only by the numeric content of those bytes 114.

Lastly, the stop or "End-Of-Table" command is stored in the terminal or last location 116 of each Branch 85—the output code being identical with that (96 in FIG. 2) in "end-of-group" locations (not shown herein) of Tables 80,82. In List Mode, the stop command location 116 is attained only when consecutive pressings of Index Key 20I have caused display of all words in the particulr Branch 85 selected—i.e. all word remnants having the same root as was established through use of tables 78-82 and possibly Extension 84. This condition may be accompanied by an appropriate message to that effect in Display 16.

At this point, it should be recalled that for reasons of compaction, the characters 110 (WT codes 112 and numeral codes 114 as well) forming the word parts stored successively in each Branch 85 of tree structure 84 are preferably present in the form of a variable number of bits corresponding to a Huffman code (a known type discussed in more detail in References I) where the most frequently used characters have the shortest bit-length codes (3 bits, say), whereas the least frequently used characters have the longest bit-length codes (13 bits, say). As known, each code is nonetheless unique even though packed in memory without regard to byte boundaries.

For a first version of the preferred embodiment of the invention, it is assumed that because the typist decides help is needed for proper spelling of a particular word to be printed on paper 15a, Code Key 21 and the Alphabetic Key 18L are pressed simultaneously to initiate the List Mode according to the present invention. The immediate result visible to the typist is the disappearance of previous text from Display 16 and appearance of the message "List:" in its place (the result stemming from a known clearance and from read-out of a predetermined text in a known fashion). At the same time, though not visible externally, elements associated with List Mode are initialized: a WS Counter 212 is reset to ZERO for reasons evident shortly, the List Mode Flag 206 and an Enter Template Flag 216 are set to ONE, a Character Pointer 211 and the respective Bit and Byte counters 118, 119 are reset to ZERO, the Huffman Code Flag 41 reset to ZERO, Pointers 55 set to the beginning address of Table 78, and other flags, pointers and counters set to appropriate values, as will be seen. Also, various registers used in the listing process are cleared.

In response to the prompt in Display 16, the typist enters one or more successive alphabetic characters via Keys 18 of Keyboard 10, these characters defining the identity and order of the first characters present in the word the typist is seeking. The number of characters entered varies depending on the typist's certainty as to these first characters, but being at least one, of course, and fifteen at maximum. In any event, after being converted to five-bit code by the known converter 46 of References I, the successive characters are entered in a Look-up Display Register 218 and also saved in External RAM 254, being stored in a Temporary Register 210, both registers having been cleared during the above initialization. The characters stored in Register 210 form what is termed a "template", hence Register 210 and its contents are referred to as the "Template Register" and "Template 1", respectively, hereinafter. At each character entry, Pointer 211 indicates the storage location in Registers 210 and 218 and thus the number of characters in Template 1. Accordingly, after each character is entered in Registers 210 and 218, Pointer 211 is incremented (all incrementations and decrementations referred to herein being by one unit unless otherwise stated) to show the location where the next character is to be placed in Registers 210, 218.

Because List Mode 203 displays but one word at a time, location of the word endings (112,114 in Branches 85) is critical to the process. As shown in Tables 80, 82 of FIG. 2, Word Terminator Codes 112 are present in these tables, being included—where appropriate—as part of the eight-bit byte structure of ROM 52. As explained in References I, only five bits are needed to distinguish the alphabetic characters present in the words stored in Dictionary 56 (distinction between upper and lower case not being necessary), thus the excess high-order bits of each byte in the data of Tables 80-82 are used as follows: one bit order (the seventh, next-most significant bit) assigned as a Word Terminator 112 indicator and another (arbitrarily chosen to be the most significant bit) as an indicator that all subsequent characters are stored in extension 84 and in the form of the above-mentioned Huffman codes.

Entry of the last template character through Keyboard 10 is signaled by the typist's depression of the Forward Index Key 20I. As a result, Entemp Flag 216 is reset (to prevent entry of further template characters), and generation of the first word to be displayed then continues automatically, the last-entered template character pointing to the first possible combination in the next table—e.g., if the template is "C-A", (the hyphen byte 94-3 in Table 80 (see FIG. 2) points to the first combination "C-A-B" in the CA group 98-3 of Table 82. The combination "C-A-B" being a word in Dictionary 56, the "B" argument byte contains the code 11000010, the ONE as most significant bit indicating that Huffman coding begins with the very next character; the ONE in the next-most significant bit signifying a Word Terminator 112, both as described above. In List Mode (Flag 206 set), each WT code 112 functions to set the Word Terminator Flag (WTF) 34 in STATUS RAM 24D. The pre-condition necessary for a complete word from Dictionary section 56 to be depicted in Display 16 is the set state of WT Flag 34, the character at the immediately preceding location being the last in the word—all information for display being available, therefore. The word in Look-up Display Register 218 is accordingly transferred to a Display Buffer 220 where it is converted in known fashion from 5-bit code to the matrix code of Display 16 by use of an appropriate conversion table 222, say, in ROM 52. Microprocessor 24 then supplies matrix codes via lines 74a to Display Drivers 76 which feed them—in turn—via bus lines 74b to the liquid crystal device serving as Display 16 in known fashion.

On the other hand, if the character code in the last look-up table (e.g. 82, etc) does not contain a WT Code 112 (actually a marker bit in the byte holding the 5-bit code, as explained previously), then the word generation continues into the branch 85 addressed by the pointer information in the preceding look-up table where the ONE in the most significant bit position signals start of Huffman code. For compatibility with the remainder of the data in Dictionary 56, all Huffman Code data derived from Extension 84 must first be converted to the previously-noted five bit code prior to utilization. In this conversion, proper attention must be given—as briefly pointed out below—to the position of the initial bit within the code (if other than the first Huffman code, where the first bit always occurs immediately after a byte boundary).

To this end (as detailed in References I), presence of the ONE bit at the most signicant position in the code in Table 82 sets Huffman Code Flag 41 to ONE. The set state of Flag 41 initiates operation of two counters 118, 119 (software) incremented under control of clock 27 in known fashion. Counting begins with the next byte and the values in Counters 118,119 determine, respectively, the number of bits and bytes (every eighth bit) thereafer which define each unique Huffman code. Each Huffman code is serially converted to the corresponding 5-bit code using—in well known fashion—a binary tree structure 120 forming part of ROM 52. The serially-presented binary values of each Huffman code define a unique path through tree 120, the path ending when a discrete table entry (byte) storing a ONE in the most significant position (bit 7) is encountered as a signal that the value located at a specified address is the corresponding 5-bit code (less significant five bits of the byte at that address). Accordingly, upon finding a ONE in the eighth bit of a corresponding table entry, operation of Counters 118, 119 is stopped and the current byte count and bit count stored in respective bytes at Pointer area 55 (overwriting the previous contents) for subsequent reference. At the same time, the 5-bit code for the character just read in Branch 85 may be supplied, for example, to the accumulator in ALU 29. In List Mode 203, the decoded character is then transferred from that accumulator to the next position of Register 218—the position identified by the value in Pointer 211. After transfer of the decoded character, Pointer 211 is incremented and the values stored in pointer area 55 are read back, bit counter 118 incremented by unity (with a carry if a binary "7", and resultant incrementing of the byte counter 119); the respective counter 118, 119 is set to its new value, if any, and counting operation again enabled for detection and conversion of the next variable-length character in Branch 85 followed by its transfer to Look-Up Display Register 218 in the manner just described.

The above process continues until the next character in branch 85 proves to be a word separator: a Word Terminator code 112 or a numeral code 114, as shown in FIG. 3. In Branches 85, "Word Terminator" code 112 is binary 1111—i.e. decimal 15—when the Huffman code of References I is used. At this point, the read out of Branch 85 ceases because of detection of the first word separator in the sequence of characters after the template characters. In List Mode (Flag 206 set), each WT code 112 or numeral code 114 (the seventh bit—bit 6—being a ONE in this case also) functions to set the Word Terminator Flag (WTF) 34 in STATUS RAM 24D. As mentioned earlier, the set state of WT Flag 34 is the pre-condition necessary for a complete word from Dictionary section 56 to be depicted in Display 16. The word in Look-up Display Register 218 is accordingly transferred to Display Buffer 220 and, the word separator read out now being in a Branch 85, WS Counter 212 is incremented in preparation for possible need to display a further word. Note that any word separators 112, 114 encountered while entering characters of Template 1 into Register 218 from a Huffman Code Branch 85 also increment WS Counter 212, but are otherwise ignored until the automatic scanning described locates the next word separator 112,114 and the WT Flag 34 is set during the usual pre-scan, as disclosed in References I. At that time, Counter 212 is cleared after storing the incremented value in an EOW Count Register 226 for purposes of detecting the end of a new word, if commanded.

As previously described, the word in Display Buffer 220 is then converted in known fashion from 5-bit code to the matrix code of Display 16 by use of Conversion Table 222 in ROM 52. Microprocessor 24 then supplies the matrix codes to Display 16 (via lines 74a to Display Drivers 76 and bus lines 74b).

The foregoing description has perhaps implied need for several characters per template but it should be remarked that even one character may suffice to establish a template though somewhat less likely to give rise to a "List Mode" instruction, as a practical matter, because of the amount of word-by-word scanning which may be required before the desired word is found.

If the typist is not satisfied with the word displayed, Index Key 20I may be pressed again to initiate search for a second word from Dictionary 56. As before, the Display 16, Bit and Byte Counters 118 and 119 in Pointer area 55, Character Pointer 211 and Register 218 are cleared in known manner. Thereupon, the characters of Template 1 are transferred sequentially from Register 210 to Register 218 to establish anew the template's path through Tables 78, 80, and 82 and into Extension 84, if necessary. At this point, it must be stated that to facilitate establishment of this path efficiently, during the abovedescribed template entry, a Branch Register 228 (see FIG. 5) stored numerical values in up to five successive bytes (because of the possibility of five look-up tables for some Branches 85 herein, as mentioned earlier) under control of a Level Pointer 231 similar to Character Pointer 211, but limited to a count of five. The stored values correspond to address locations in look-up tables of the letter-combination type 78-82 disclosed in References I.

For greater efficiency, the values stored at each "level" 230 of Branch Register 228 are not necessarily equal to those stored in Register 210, but are related to them in following fashion. As pointed out in the disclosure of References I, contrary to the situation in Table 78 where all letters of the alphabet are represented, certain letter combinations which are never found in the first few characters of words of Dictionary 56, are therefore omitted from the Look-up Tables 80, 82 (etc). Consequently, the five-bit character code entered in a given table of the type 80, 82 often has not agreed with the relative position of the correspnding argument in that table, yet this position is what actually determines the selection of the address in the next look-up table or Branch 85 when one seeks to display a succession of words having a common template—i.e., a common initial path. Accordingly, in List Mode during the template entry activities just described, as each template character is entered into Register 210, a related value is also entered in a corresponding byte 230 of Branch Register 228, the exact byte or "level" being determined by the count stored in Level Pointer 231, that count being incremented as each related value is entered. The related value is determined differently according to the arrangement of the particular table. For the first character, the "related" value for use with Table 78 is the actual five-bit code; whereas for subsequent characters, the "related" value to be entered is determined during generation of the characters of the first word to be displayed in List Mode 203. The determination is performed by recording, in known fashion, the number of comparisons required before a match is obtained between the character code and an argument of a letter-combination group of the table selected (80,82, etc.). Thus if a "c" is entered as a first character in table 78, a direct addressing occurs, as previously stated, so a "3" will be entered in the byte 230 of concern (first from left end); whereas if a "g" were entered as the second character and was, say (example only), the first argument of Table 80 (because of the earlier-mentioned letter-combination omissions), a match would be obtained on the first comparison even though the five-bit "g" code is 00111 (a "7"), hence a "1" would be entered in the byte 230 of concern (second from left end), etc.

Therefore, to regenerate the path in Dictionary 56 when the first word displayed (or any subsequent word) is not the one desired and Index Key 20I has been pressed, the values from Branch Register 228 are read out in sequence under control of Level Pointer 231, starting with the first (leftmost in Fig.5). In accordance with the arrangement of Table 78, twice the value 232-1 stored in the first (leftmost) byte 230 is added to the starting address of Table 78 to locate the respective pointer information (two data bytes) defining start of the bi-character group 90-n designated by the first character (coded value 232-1), in manner similar to that disclosed in References I. Then, adding thrice the value 232-2 stored in the next byte 230 (leftmost less one) to the starting address of Group 90-n in Table 80 locates the respective pointer information (because an argument byte is associated with the two data bytes) defining the start of the tri-character Group 98-n. Similarly, adding thrice the value 232-3 stored in the next byte 230 (leftmost less two) to the starting address of Group 98-n locates pointer information defining the start of the corresponding Branch 85—if bit 7 in the address byte is a ONE—or possibly to a fourth and even a fifth look-up table (not shown, but discussed previously). If bit 7 is a ONE (during the previously-mentioned pre-scan), the Huffman Code Flag 41 is set to ensure properly-timed initiation of the necessary decoding activities as disclosed in References I. Note that use of Branch Register 228 affords much faster path regeneration for List Mode than would be available by retention of the multiple comparison technique utilized in obtaining the first word (that technique being more fully detailed in References I with respect to the spelling-check routines of the Dictionary Mode).

During the new word generation phase initiated by pressing Index Key 20I, upon reaching the Branch 85 selected by the pointer information from the last of the look-up tables (that containing a ONE in bit 7 of the character code, which table is assumed to be Table 82 for purposes of this description, as previously mentioned), decoding of the successive characters is again performed using Conversion Table 120 and the resultant five-bit codes entered in Look-up Display Register 218, both in the manner described previously. As then, each word separator (WT Code 112 or numeral code 114) encountered results in incrementing WS Counter 212 but is now followed by comparison of the incremented value with that stored in EOW Count Register 226 upon display of the previous word (not accepted by the typist as evidenced by the pressing of Index Key 20I. As stated earlier, the first word displayed caused WS Counter 212 to reach a value including the word separator 112, 114 demarking its end, but that value was incremented once more before being stored in EOW Count Register 226. Hence, EOW Count Register 226 actually then always stores a count equal to the number of word separators which must be found to reach the end of the next word. The count stored is always greater by one, therefore, than that for the first word (or the word just rejected).

The value in numeral code 114 is transferred into Character Pointer 211 and the portion of Look-up Display Register 218 which follows is cleared by incrementing Pointer 211 to point to the next location after Template 1 and inserting a ZERO (a "blank") in that location and all subsequent to it, until the entire remainder has been blanked to insure removal of undesired excess characters (note that in Fig.4 the characters 124, 126 and 128 would not remove the eighth through twelfth characters of the first word). The first character 110 of the new word appears after the word separator which ended the first listed word. The word separator may be a WT code 112 but may also be a node indicator (e.g. 208 in FIG. 3). Specifically, it may be numeral code 114 which designates not only the end of a word, but also the existence of a node, an ordinal position at which each valid word sharing the previously entered characters begins to differ, as will be recalled. Accordingly, Character Pointer 211 is again set to a count corresponding to the position indicated by the numeral code 114, the current content of Pointer 211 being written over suchthat it then points to the proper position in Register 218 for entry of the first character read of the new word remnant read from Branch 85.

As seen in FIG. 3, the word remnants in Branch 85 are stored in alphabetical sequence with each remnant after the first word in a given Branch 85 (which remnant may include further nodes) being preceded by a numeral code 114 (e.g.132, 224). Each development of a new word begins with a scan of Template 1 in Register 210 in the manner previously described, with the count in WS Counter 212 being incremented as each Word Terminator 112 or numeral code 114 in Branch 85 is detected, and compared in known fashion with the value stored in EOW Coung Register 226 (and if the word separator is a numeral code 114, the ordinal position identified being transferred to Character Pointer 211). If the values in WS Counter 212 and EOW Count Register 226 don't agree, the memory scan continues as above. If they agree, however, then the end of the new word has been found and the charactrs in Template Register 218 are displayed.

Detection of a numeral code occurs during the same pre-scan mentioned previously with respect to detection of a Word Terminator code 112). As pointed out earlier, bit 6 in the unused portion of the eight-bit byte, will be a "ONE" if the next data byte is a numeral code 114. In such case, the Counter 118 is likewise incremented by unity and a Numeral Flag 37 in Status RAM 24D is set, the set state of Numeral Flag 37 in List Mode 203 causing the newly designated data byte to be written into Character Pointer 211 over the previous content.

For a second version of the preferred embodiment of the invention, it is assumed that whether as a result of a signal from beeper 19 or because the typist is uncertain as to proper spelling of the remainder of a word that has been started, Code Key 21 and the alphabetic key 18L are pressed simultaneously after entering a number of characters equal to or less than a full word, i.e. "post-template" entry into List Mode.

This second version encompasses the first version as it also allows template entry after establishment of List Mode 203. As before, the initialization described previously is performed first. Next, however, List Mode 203 causes a search of Correction Buffer 54 to find the last word terminator (space, period, etc) followed by a valid character prior to the above-mentioned simultaneous depression of code Key 21 and the "L" Key 18L of Keyboard 10. The search is performed by decrementing a Correction Buffer Pointer or "Rescan" Pointer 234 as it will be termed hereinafter, while comparing in a known manner the code stored at each location with codes for the above-mentioned word terminators. Upon detecting a word terminator, Rescan Pointer 234 is incremented to point to the first of the characters in Correction Buffer 54 (stored in form for control of pointer 14—e.g. a Daisy position code) following the detected word terminator. The characters are then read in sequence and converted to 5-bit code using Conversion Table 46 in fashion described in References I, Rescan Pointer 234 being incremented after reading each character in Correction Buffer 54 so as to point to the next position therein. Contemporaneously, the converted codes are stored in Template Register 210 and Look-up Display Register 218 at successive positions under control of Character Pointer 211 in the same manner as previously described, Character Pointer 211 being incremented after the reading, decoding and storing of each character from correction Buffer 54. This template entry from Correction Buffer 54 stops on finding a space or other word terminator in Buffer 54, and generation of additional characters by reading them automatically from Dictionary 56 proceeds in the manner described for the first version, display of a complete word following detection of the first word separator 112 or 114 after any character subsequent to the last of the template characters. If the first character addressed in Buffer 54 is not valid (digit, punctuation, etc.) then it is not retrieved for decoding, storage, etc., and List Mode 203 returns to the initialization program referred to in the first version, where a check is made at the first character position of Template Register 210. If that first position holds a space (or "blank") then no character capable of acting as a template has been entered. At this point, the situation is identical to that for the first version where template characters are entered by the typist subsequent to establishment of List Mode, in response to appearance of the word "List:" as a prompt on Display 16. The typist may then proceed in the manner previously described.

As mentioned earlier, the typist may decide to enter the List Mode in response to detection of a spelling error (the system being in the Dictionary Mode disclosed in References I) as evidenced by emission of a warbling sound from Device Spelling 19. In this particular case, while Error Flag 36 was set when an erroneous character (one that failed to match any of those at a like position in an otherwise valid word—i.e., a word present in Dictionary 56 up to, but not at that point in the string of entered characters) was entered via Keyboard 10, it may be noted that though not specifically stated earlier, Flag 36 too was reset during the previously-mentioned initialization accompanying entry into List Mode. The reason for this is that as each character of the string is read out of Correction Buffer 54 in the manner described above, it is again compared with the contents of Dictionary 56 and when an error signal appears on lines 96 or 116 (End-of-Group or End-of-Branch) as a result of failure to find a matching character in Dictionary 56, the again-emitted signal sets the Error Flag 36, the set state of which then inhibits any further transfer of characters from Correction Buffer 54 into Template Register 210 and/or Look-up Display 218 in known fashion.

Transfer into Look-up Display Register 218 remains enabled to allow receipt of the additional characters developed automatically from Dictionary 56 and presentation of the first word in Display 16, all in the same manner as described previously herein with respect to the first version and thus not needing a new description.

Response of both versions to the Index Key 20I and Reverse Index Key 20RI is identical. Pressing the former causes generation and display of a new word containing the template characters as the initial characters, whereas pressing the latter causes generation and display of the word displayed immediately previous to the word currently on display.

If the typist finds that successive operations of Index Key 20I have caused the word listing to pass the best choice, the listing may be reviewed, as mentioned earlier, by pressing Reverse Index Key 20RIN. As a result, generation of the "new" word (in this case, the one previously displayed) begins by decrementing the value in EOW Count Register 226, such that agreement with the count in WS Counter 212 will occur at a word separator 112 or 114 located in the selected Branch 85 of Extension 84 exactly one word earlier than the current word being displayed. This reversal of display continues in the manner just described until Register 226 reaches the count of ZERO, at which time the Huffman Code Flag 41 is reset and List Mode Progam 203 jumps to a reverse scan of Branch Register 228, beginning with the level pointed out by Level Pointer 231. If the byte 230 indicated is blank, Level Pointer 231 is decremented, and the value stored in the newly designated byte 230 used to find the corresponding argument byte (by addition to the starting address of the table appropriate to the pointer information in Level Pointer 241—e.g. "3" identifies Table 82). If the argument byte has a ONE in bit 7 (Word Terminator 112), the WTF flag 34 is set and character generation ends at the character identified by the value stored in the last byte 232-3. (The stored value may possibly be in a higher or lower level of Branch Register 228 pointed to by Level Pointer 231, as mentioned in connection with need for either early or delayed introduction of Huffman Coded Branches 85 in the Look-up Tables 80, 82 etc.), that character being the argument byte at the location in Dictionary 56 specified by the sum of the stored value 232-3 plus the starting address of Table 82 (or other table). Should the Reverse Index Key 20RIN be pressed anew, Level Pointer 231 is then decremented such that character generation ends with the argument byte of Table 80 identified by the stored value 232-2 in the second byte 230 from the left.

Considering next the selection of a displayed word as being the one sought, upon pressing the Return Key 20R when the desired word is present in Look-up Display Register 218 and presented in Display 16, character Pointer 211 is set to a value of ONE to point to the first character position in Register 218. The 5-bit character code stored in that position is read as Rescan Pointer 234 is incremented in usual manner.

On the other hand, if the template characters originated from a series of entries via Keyboard 10 which included one or more incorrect characters accompanied by an error signal on "lines" 96 or 116 (FIG. 2), Program 203 begins output of the desired word with correction of the erroneous characters printed on paper 15, by performing a comparison of the contents of Registers 210 and 218 character-by-character with the original ones from Correction Buffer 54. These were removed from Buffer 54 and stored in a temporary register (not shown, but known) in a known manner during the previously described "rescan" which found the space or other punctuation defining the start of the word serving as template. The original word is first compared with the template characters in Register 210 and should agree—if not, an error signal is emitted and the printout ended. If they agree, then on detecting the end of the template (blank in Register 210), the comparison continues with the characters of Register 218, any disagreement here causing a marker (bit 7 changed to a ONE) to be inserted in the corresponding byte in Register 218. The comparison continues until a blank is detected in the temporary register. At this point, a printed text correction is initiated which removes the incorrect character in a known correction cycle involving use of correction ribbon 15b, followed by printing of the replacement character from Register 218, after appropriate conversion using Table 236, of course.

As an example of operation to the invention, assume a word was just completed (Space Key 20S pressed, say) and that the desired word is "capable," but the typist is uncertain of the exact spelling beyond the first few letters. Hence the typist has pressed Code Key 21 together with the "L" Key 18L of Keyboard 10 with the result that List Mode Flag 206 is set to a ONE, thus enabling List Mode program 203. The first phase of the listing routine is the initializing of the List Mode registers, counters, pointer and flags in the known manner previously described (by resetting to ZERO or some other appropriate value)—e.g., Character Pointer 211 and Level Pointer 231 are set to ONE; Registers 210, 218 and 228 are cleared and Flags 34, 37 and 41 reset to ZERO, while the "Enter Template" Flag 216 is set to a ONE and Display 16 presents the "List:" prompt. The typist then presses the "c" key of Keyboard 10 and the first character input signal appears on bus 50 to begin the template. That signal is first changed to 5-bit code (Converter 46) from the printer code form ("Daisy poisition" code) in which it is obtained from FIFO storage 48, as explained in References I. The 5-bit code for the "c" being a binary "3", that value is stored in the first character position of Registers 210, 218 under control of Character Pointer 211. Character Pointer 211 is then incremented to assure that the next character entered will become the second one of the template. The program then returns to a known idling routing to await entry of a further template character. When the second character (the first "a" is entered via Keyboard 10, it is again in the form of a Daisy position code, so it is immediately converted to a 5-bit code (binary 1 for an "a") using the Look-Up-Table 46, then stored in the second character positions of Registers 210, 218 pointed out Character Pointer 211, following which another incrementation of Pointer 211 occurs. The process is repeated at each entry of a template character via Keyboard 10.

Assuming the typist decides on just four characters (c-a-p-a) as the template, then Index Key 20I is pressed next, resetting Entemp Flag 216 to block further entry of template characters and setting Pointers 211 and 231 to ONE as a preliminary to entering a word generation phase which begins with read out of the first character in Template Register 210 under control of Character Pointer 211, now pointing to the first character position. The binary 3 code stored there is transferred to the first level in Branch Register 228 for future resuse, the first level in Branch Register 228 relating to Table 78. The value 232-1 in the first byte 230 is thus a "3" in binary code. Then the "c" code is multiplied by two and added to the arbitary start address (x, say) of Table 78 in ROM 52 to locate the proper data byte area in memory—x+6 in this example, since "C" is the third character of the alphabet—and the corresponding address saved in the 16-bit pointer area 55. Character Pointer 211 and Level Pointer 231 are then incremented such that they point to the second character positions of the Registers 210, 228. The value stored in the 16-bit pointer area 55 is then retrieved to locate the start of the di-character C-n group 90-3 ("n" being any one of the alphabetic second characters joined to a "c" in Dictionary 56) in look-up table 80. As in References I, the arguments in Table 80 consist of successively greater character codes, each followed by two bytes (16 bits) of address that point to start of a related tri-character group in Table 82. The correct address bytes are normally found by comparison with an entered character that character here being an "a" which is found to be a match on comparison with the first argument in Table 80, so the associated 16-bit address 94-3 is put into pointer area 55 for finding the proper location in Table 82 upon the next character entry.

Only one comparison having been required to match the character read from Register 210, a ONE is placed in the second character position of Branch Register 228 as selected by Level Pointer 231. The two pointers 211, 231 are again incremented, and Program 203 causes the third character "p" to be read from Register 210, the above process being essentially repeated: the 5-bit code (10000—i.e., decimal 16 for a "p" being read at the third position of Register 210 and pointers 211 and 231 again being incremented. Address 94-3 (FIG. 2) is then retrieved from Pointer area 55, this address pointing to group 98-3 which begins with the letter B as the third character, but the "B" code will not yield a match on comparison with the "p" code. Accordingly, the value from pointer 55 is incremented and the comparison repeated until the "p" argument is found (following the 14th comparison, the combination CAA being the only one omitted in Group 98-3). The coded value "14" is then entered at the third character position of Register 228. The address data associated with the "p" is 102-7 (FIGS. 2 and 3) and points to the first memory location 108 of the related branch 85 of Extension 84. In this particular case, Table 82 is followed immediately by a Branch 85, just as in References I. Branch 85, it will be recalled, is in Huffman Code and this is signaled by the set state of HCF flag 41 resulting from a ONE in bit 7 in the unused portion of the byte holding the "p" argument code in Table 82. Since the combination CAP is a complete word, a word terminator (indicated by a ONE in marker bit 6) is also present in the byte so WT flag 34 should be set, but is not because Template Register 210 still contains a template character. Program 203 then returns to read-out routine.

On reading the fourth template character at Register 210 (another "a"), the HCF flag 41 having been set, there is no further action insofar as Branch Register 228 and Pointer 231 are concerned because all further characters are in Branch 85. The first symbol in that branch is also read and is the character "a", this being of no significance here since Program 203 is still in the template control phase. The counts in bit and byte Counters 118, 119 are saved, however, after decoding in Converter 120. A pre-scan for a word separator (WT 112 or numeral code 114) follows in the manner described in References I, but has a negative result, the next symbol being the character "b". Program 203 is therefore again returned to the read-out routine after an incrementation of Pointer 211, which now designates the fifth character position in Register 210.

Only four template characters having been entered, a blank or space is read from the fifth position of Register 210. The read out also enabled a read out of the next character in Branch 85, so the "b" code found at the second memory location 108 of Branch 85 (fifth character of the first word stored therein, FIGS. 3 and 4) is stored at the corresponding location in Register 218 following the four template characters stored previously. The Character Pointer 211 is again incremented, another unsuccessful pre-scan for a word separator performed and the read out routine enabled again. The routine is followed in the fashion described, as the next seven characters ending with the "S" are generated and stored in corresponding positions in Look-up Display Register 218. In that last readout, the usual pre-scan is performed, but this time detects the word separator code (a numeral code 114) at 208. Accordingly the WTF flag 34 is set and the count in WS Counter 212 incremented such that is is a "1".

In response to the set state of WTF flag 34, the word "capabilities" is transferred to Display Buffer 220, the characters converted to matrix code by Conversion Table 222 and sent to Display 16 where that word appears for the typist to inspect. At this time, the WS Counter 212 is incremented once more and the incremented value (a "2") stored in EOW Count Register 226. Following transfer to Register 226, WS Counter 212 is cleared.

Because the typist seeks the spelling of the word "capable" in this example, Index Key 201 is pressed to call for display of the next alphabetically-ordered word in Dictionary 56 which shares the first four characters—the template—found in "capabilities". Pressing of Key 201 clears Display 16, Bit and Byte Counters 118 and 119 in Pointer Area 55, Character Pointer 211 and Register 218. Thereafter, the characters of the template are transferred sequentially from Register 210 to Register 218, but the template's path into Dictionary 56 through Tables 78, 80, 82 (etc.) is regenerated in simpler fashion by use of Branch Register 228, none of the repeated comparisons performed in generating the first word being required on the second and further pressings of Index Key 201. Thus the value 232-1, a "3" for character "c", is multiplied by two and added to the initial address of Table 78, to obtain the location of group 90-n in Table 80, as previously described, while the "c" code is entered into the first character position of Register 218, as called for by the ONE in Pointer 231. That point is then incremented to a "2". Next, the value "1" for 232-2 in FIG. 5 is read from Branch Register 228 and then multiplied by three, the product being added to the above-mentioned location to find the byte storing "p" as argument. The argument code (00001 for an "a") is then stored in the second position of Register 218. The augmented product is then incremented for locating the two bytes defining the address for the start of tri-character group 98-n in Table 82. The Pointer 231 is incremented to a "3" and the value "14" at 232-3 in Register 228 is read out and multiplied by three and added to the address of group 98-n to locate the "p" argument code which is then stored in Look-up Display Register 218 at the third character position.

The presence of the marker in Bit 7 of the byte storing the 5-bit "p" code (10000) is detected and HCF flag 41 is set. The presence of a ONE in bit 6 is again ignored for the reason given previously. The address of the "p" argument just obtained is incremented to find the two bytes defining start of Branch 85. HCF flag being set, the character scan shifts to Huffman Code, and characters in Branch 85 are read out and converted as before with a pre-scan for word separator codes as each character is decoded. Upon detection of the numeral code 114 at 208 the WS Counter 212 is incremented, but comparison with the value in EOW Counter Register 226 is not found to be in agreement, hence the WTF flag 34 is not set (or if set by the pre-scan is then reset). Accordingly, the value "10" from numeral code 114 is transferred to Character Counter 211 and Register 218 cleared of the "E" and "S" in 11th and 12th character positions thereof (by insertion of blanks in the positions of Register 218 beyond the 10th as previously described). The bit value for Counter 118 is then incremented (with carry into byte counter 119, if required) and counting enabled so as to read the "y" code as the next character in Branch 85, the bits of the code again being decoded in Converter 120. Following this, the resultant 5-bit code is stored in the 10 position of Register 218. In the usual pre-scan which comes next, the numeral code 114 containing a "6" is detected as a word separator, causing incrementation of WS Counter 212 to the value 2. When compared with the value stored in EOW Counter 226, the two values are found to be in agreement, so WT flag 34 is set and the word "capability" transferred to Display Buffer 220 from which it is sent to Display 16 in the usual fashion. WS Counter 212 is incremented to a "3" the incremented transferred to EOW Count Register 226, and WS Counter 212 cleared.

Upon display of that word, the typist sees that it is not the one being sought, so Index Key 21I is again pressed. Generation of the next word proceeds as above: initialization of the List Mode counters, pointers etc., scanning of Branch Register 228 to establish the path through Tables 78–82, and Branch 85—with incrementation of WS Counter 212 at each word separation 112, 114 and subsequent comparison with the content of EOW Count Register 226. Because the value in this last register is now a 3, the character generation does not stop at the numeral code 114 containing the number "6" at 132 because incrementation of WS Counter 212 only brought the count therein to a "2". The "6" is transferred to Character Pointer 211, the bit Counter 118 incremented and counting by bit and byte Counters 118, 119 again enabled to read out the L and the E characters 124, 126. The Huffman codes for these are decoded in Converter 120 and the corresponding 5-bit codes entered into the 6th and 7th positions of Look-up Display Regiseter 218 as controlled by Character Pointer 211 (incremented at each read-out, of course). The usual pre-scan for a word separator fails at the read out for the 6th position, but is successful at the 7th position because of detection of the number "7" at 224 in FIG. 3. The resulting incrementation of WS COuner 212 brings the value therein to a "3" which now agrees with that in EOW Count Register 226 upon performing the requisite comparison. That agreement results, in turn, with setting the WT flag 34, followed by transfer of the word "capable" to Display 16 as described above.

The desired word having been found, pressing the Return Key 20R transfers the content of Register 218 character-by-character (with conversion from 5-bit code to Daisy-position code using Conversion Table 236) to the Correction Buffer 54 where it is available for correction of printed text on paper 15a using the correction ribbon 15b and print ribbon 15c in fashion well-known in the art. It is also added to the display register (not shown, but known) holding text previously displayed, incorrect stored characters being written over or blanked out first in known fashion.

Should the typist be a poor speller and have pressed Index Key 20I once more with corresponding display of the "Y" character 128, the Reverse Index Key 20RIN would be pressed, decrementing EOW Count Register 226 from a "4" (obtained upon detecting the next word separator code 112, 114) to the "3" which caused prior display of the word "capable" as above described.

The foregoing has disclosed a word-processing apparatus having an input keyboard 10, a multi-character display 16, a printer 14, and a dictionary storage 56 together with an electronic control circuit 200 including a List Mode Program Control 203 providing for display of a series of correctly-spelled words from the Dictionary storage 56 presented in alphabetical order by selectable operation of particular keys (21, 18L, 20I, 20RIN) of keyboard 10.

What is claimed is:

1. In a word-processing apparatus having an input keyboard with alphabetic keys, a multi-character display, a printer output, and a dictionary storage containing a word list for verifying the spelling order of character inputs; the combination of:
   (a) first and second control key means included in said input keyboard,
   (b) template-forming means operable in response to entry of a string of alphabetic characters via said alphabetic keys,
   (c) first and second storage areas in said dictionary storage holding character information comprising said word list, successive words thereof being alphabetically arranged and demarked by word separators, said character information in said first storage area comprising a succession of root character sequences having at least two root characters therein; character information in said second storage area being arranged in a tree structure with a plurality of branches, each branch stemming from a discrete one of said root character sequences and holding at least one word remnant associated with said discrete one sequence, each said word remnant being followed by one of said word separators;
   (d) detection means signalling presence of each said word separators in a branch,
   (e) a counter incremented in response to a signalling by said detection means,
   (f) a register for storing values from said counter,
   (g) comparison means having an equality output,
   (h) listing means, including said comparison means, responsive to actuation of said first control key means and being operable to set said counter and said register to zero, clear said display of existing characters and replace same with a first word from said dictionary storage, said first word containing the template formed by said entry and ending in the one of said branches defined by a particular root character sequence corresponding to said entry, said ending occurring upon a signalling by said detection means of the presence of a first one of said word separators subsequent to said template, said counter being incremented once in response to said signalling and once more in response to said ending, the resultant count in said counter then being stored in said register, and
   (i) means, including said comparison means, responsive to actuation of said second control key means and being operable to replace, in turn, said first word discerned by said template with a succeeding word in said dictionary storage, said succeeding word containing at least the template formed by said entry and a minimum of one character between said first word separator and a next word separator in said branch said next word separator being identified by an equality output by said comparison means upon a comparison of the incremented value in said counter with said resultant count stored in the register.

2. The word-processing apparatus of claim 1, wherein said input keyboard includes a command key and said listing means responsive to said first control key means are responsive to simultaneous depression of said command key and a discrete one of said alphabetic keys.

3. The word-processing apparatus of claim 1, wherein the incremented value in said counter is again increased by unity and stored in said register in response to said equality output.

4. The word-processing apparatus of claim 1, wherein
(a) said character information in said first storage area is held in a first, numeric code format, and said at least two root characters in said root character sequences comprise a first root character selected from the entire alphabet, and at least one further root character, said sequences being arranged in alphabetically-ordered groups identified by a particular first root character in combination with at least one other alphabetic character, the further root characters in at least some of said groups omitting certain characters of the alphabet, as predetermined by said word list;
(b) character information in said branches is held in a second code format,
(c) said listing means includes (1) a branch-selection register comprising a predetermined plurality of ordinally-arranged bytes, (2) a first pointer for designating successive ones of said bytes, said first pointer being initialized to designate a particular byte of said plurality upon actuation of said first control key means, and (3) means responsive to entry of a first character of said string and effective to store said first character of the string in said particular byte as a numeric value according to said first code format, and to increment said first pointer, thereby designating a next byte of said ordinally-arranged bytes; and further including:
(d) means comprising a second pointer and said comparison means and being effective upon entry of a next character of said string to (1) compare said next character of said string with a correspondingly-ordered further root character of a group in a discrete one of said root character sequences selected by said first character of said string in combination with at leasst one next character of the string, said second pointer being incremented to a respective numeric value in response to each comparison performed by said comparison means, (2) store said respective numeric value in the byte designated by said first pointer, storage of said respective numeric value occuring in response to said equality output, and (3) increment said first pointer; and wherein
(e) said means responsive to actuation of said second control key means utilizes the value in at least a first two of said successive ones of said bytes to select said branch stemming from said discrete one of the root character sequences.

5. The word-processing apparatus of claim 4, wherein at least one of said root character sequences includes word separator, said second format is a compressed code format having variable numbers of bits for the different characters, some characters with bit-length in excess of a byte, and said word separator has a discrete code in said first and second formats, and further including converting means from said second code format to said first code format operable prior to replacement of a word in said display.

6. The word-processing apparatus of claim 5, wherein said first code format requires less than all bits of said byte to distinguish said characters, at least one bit being in excess of the code format requirement, and said converting means for said second code format is enabled in response to a predetermined state of said one bit in excess.

7. A word-processing apparatus having an input keyboard with alphabetic keys, a multi-character display, a printer poutput, and a dictionary storage containing a word list for verifying the spelling order of character inputs; the combination of:
(a) control key means included in said input keyboard,
(b) template-forming means including a storage register,
(c) means storing a string of alphabetic characters in response to entry thereof via said alphabetic keys, said string containing a character non-verifiable in terms of said word list for verifying spelling order, and being preceded by a word terminator defining the end of a prior word, said non-verifiable character being located at a particular point in said string,
(d) means detecting said non-verifiable character,
(e) first means responsive to actuation of said control key means subsequent to entry of said string and being operable to clear said display of existing characters and initiate transfer of said string to said storage register,
(f) truncating means responsive to said means detecting said non-verifiable character, said truncating means controlling said transfer at said particular point so as to exclude from said storage register said non-verifiable character and any characters subsequent thereto, thereby forming a truncated template therein, and
(g) further means responsive to said control key means and being operable to place in said display a first word from said dictionary storage containing the truncated template formed in said register.

8. The word-processing apparatus of claim 7, further including alarm means generating an error signal in response to said means detecting said non-verifiable character, and wherein said truncating means are responsive to said error signal.

9. The word-processing apparatus of claim 7, wherein said input keyboard includes a command key and said listing means responsive to said control key means are responsive to simultaneous depression of said command key and a discrete one of said alphabetic keys.

10. The word-processing apparatus of claim 7, further including a correction buffer as said means storing said string, said correction buffer being associated with said printer output; said string stored in the correction buffer being preceded therein by a word terminator defining the end of prior next; a buffer pointer, including incrementing/decrementing means; word terminator detection means signalling presence thereof in said buffer; and wherein said means responsive to actuation of said control key means are further operable to initiate a reverse scan of said buffer by decrementing said pointer, said reverse scan ending in response to a signalling by said word terminator detection means; and then to initiate a forward scan of said buffer by incrementing said pointer, with transfer of successive characters of said string to said storage register under control of said truncating means.

* * * * *